United States Patent [19]

Kurz et al.

[11] Patent Number: 5,385,296
[45] Date of Patent: Jan. 31, 1995

[54] ELECTRICALLY HEATABLE THERMOSTATIC VALVE FOR A COOLANT CIRCULATING SYSTEM OF AN INTERNAL-COMBUSTION ENGINE

[75] Inventors: Manfred Kurz, Ditzingen; Roland Saur, Stuttgart, both of Germany

[73] Assignee: Wilhelm & Dauster, Stuttgart, Germany

[21] Appl. No.: 133,368

[22] Filed: Oct. 8, 1993

[30] Foreign Application Priority Data

Oct. 8, 1992 [DE] Germany .............. 4233913

[51] Int. Cl.⁶ ............................................. F01P 7/16
[52] U.S. Cl. ............................. 236/34.5; 236/68 R; 251/11
[58] Field of Search .................. 236/34, 34.5, 68 R; 251/11

[56] References Cited

U.S. PATENT DOCUMENTS

| | | | |
|---|---|---|---|
| 3,907,199 | 9/1975 | Kreger | 236/34.5 X |
| 4,426,036 | 1/1984 | Sliger | 236/34.5 |
| 4,666,081 | 5/1987 | Cook et al. | 251/11 X |
| 4,890,790 | 1/1990 | Wagner | 251/11 X |
| 4,961,530 | 10/1990 | Wagner | 236/34.5 |
| 5,018,664 | 5/1991 | Butler | 236/34.5 |

FOREIGN PATENT DOCUMENTS

| | | |
|---|---|---|
| 1943484 | 3/1971 | Germany . |
| 3018682C2 | 11/1980 | Germany . |
| 3315308A1 | 10/1984 | Germany . |
| 3504653C2 | 8/1986 | Germany . |
| 3705232A1 | 9/1988 | Germany . |
| 3817952A1 | 11/1989 | Germany . |
| 9105021.9 | 8/1991 | Germany . |
| 4035179A1 | 5/1992 | Germany . |
| 2155153A | 9/1985 | United Kingdom . |

Primary Examiner—William E. Tapolcai

[57] ABSTRACT

An electrically heatable thermostatic valve for a coolant circulating system of an internal-combustion engine in which the housing of a thermostatic working element is arranged in a stationary manner and is provided with feed lines for a heating element. The valve elements of a main valve and of a bypass valve are arranged on the working piston of the working element, the valve element of the main valve being designed such that the housing of the thermostatic working element is situated in the cold coolant flow when the main valve is closed.

11 Claims, 2 Drawing Sheets though the stationary working piston, nor is the working piston itself heated. It is therefore provided that the housing of the working element is arranged in a stationary manner so that then the heating element will be assigned directly to the housing and will be supplied by way of supply lines. As a result, it is possible to design the sealing between the working piston and the housing of the working element in a proven conventional manner without any impairment of its function by a heating element or supply lines. Because of the construction of the valve element of the main valve, the housing of the working element is always situated in the coolant flow which is cold at the start-up of the internal-combustion engine so that the thermostatic valve automatically opens up in a known manner when the coolant flow heats up and carries out the temperature control which is normal in the case of thermostatic valves. Because of the heating element, an additional controlled variable can be superimposed on this control.

ELECTRICALLY HEATABLE THERMOSTATIC VALVE FOR A COOLANT CIRCULATING SYSTEM OF AN INTERNAL-COMBUSTION ENGINE

BACKGROUND AND SUMMARY OF THE INVENTION

This invention relates to an electrically heatable thermostatic valve for a coolant circulation system of an internal-combustion engine, comprising a main valve which blocks a flow when the coolant is cold, a bypass valve which is open when the coolant is cold, and whose valve elements can be jointly adjusted with respect to stationary valve counterparts of a valve gear housing by a thermostatic working element that has a housing arranged in the valve gear housing, is situated in a coolant flow even when the main valve is closed and contains an expansion material and a working piston which is adjusted corresponding to the volume to the expansion material which is a function of the temperature.

Normally, thermostatic valves are constructed in such a manner that the valve element of the main valve and also the valve element of the bypass valve are mounted on the housing of the thermostatic working element. The working piston of the thermostatic working element is held in a stationary manner so that, in the case of a temperature-dependent volume change of the expansion material, the housing with the valve elements moves relative to the stationarily held working piston. In order to improve the controlling action of such a thermostatic valve, it is known from German Patent Document DE 30 18 682 A1 to arrange a heater plug with a heating resistance in the interior of the housing of the thermostatic working element and therefore inside the expansion material. The supplying of the heating resistance with electric energy takes place by means of lines which are guided through the stationary working piston.

It is also known, from German Patent Document DE 37 05 232 A1, to provide, instead of a thermostatic valve, a valve which can be controlled by a motor operator. In one embodiment, the motor operator is a thermostatic working element whose housing is stationarily arranged outside the valve gear housing. The working piston situated inside the valve gear housing is provided with a valve body which carries a main valve disk and a bypass valve disk in the arrangement known for thermostatic valves. The housing of the thermostatic working element serving as the motor operator extends transversely to a coolant pipe leading to the engine which is guided around the valve gear housing. The housing of the working element projects out of this pipe and is surrounded by a heating element in this area.

A control valve is known from U.S. Pat. No. 4,685,651 in which the working piston of a thermostatic working element is provided with a valve disk. In that arrangement, the housing of the thermostatic working element is stationarily arranged outside the area in which the medium flows which is to be controlled in the interior of the housing, a heating resistance is arranged which is supplied with electric energy via lines which are guided through the bottom of the housing of the working element that is opposite the working piston. In one embodiment, it is provided that the housing of the working element dips into another liquid flow so that the position of the working piston can also be determined by means of the temperature of this liquid.

It is an object of the invention to provide a thermostatic valve of the initially mentioned type which is distinguished by its increased operational reliability.

This object is achieved by the present invention in that the housing of the working element is held in a stationary manner by its end disposed opposite the working piston and is provided with an electric heating element, and in that the working piston is connected with the valve element of the main valve and the valve element of the bypass valve, in which case the valve element of the main valve forms in its closed position, together with the housing of the working element or its holding device, a sealing point blocking a flow, and is connected with the working piston via an open cage exposing the housing of the working element.

The invention is based on the recognition that a high operational reliability can be achieved only if the heating element and its supply lines are arranged in such a manner that, as a result, the sealing between the working piston and the housing of the thermostatic working element remains unaffected; that is, no lines must be guided through the working piston, nor is the working piston itself heated. It is therefore provided that the housing of the working element is arranged in a stationary manner so that then the heating element will be assigned directly to the housing and will be supplied by way of supply lines. As a result, it is possible to design the sealing between the working piston and the housing of the working element in a proven conventional manner without any impairment of its function by a heating element or supply lines. Because of the construction of the valve element of the main valve, the housing of the working element is always situated in the coolant flow which is cold at the start-up of the internal-combustion engine so that the thermostatic valve automatically opens up in a known manner when the coolant flow heats up and carries out the temperature control which is normal in the case of thermostatic valves. Because of the heating element, an additional controlled variable can be superimposed on this control.

Other objects, advantages and novel features of the present invention will become apparent from the following detailed description of the invention when considered in conjunction with the accompanying drawings.

DETAILED DESCRIPTION OF THE DRAWINGS

Figure 1:
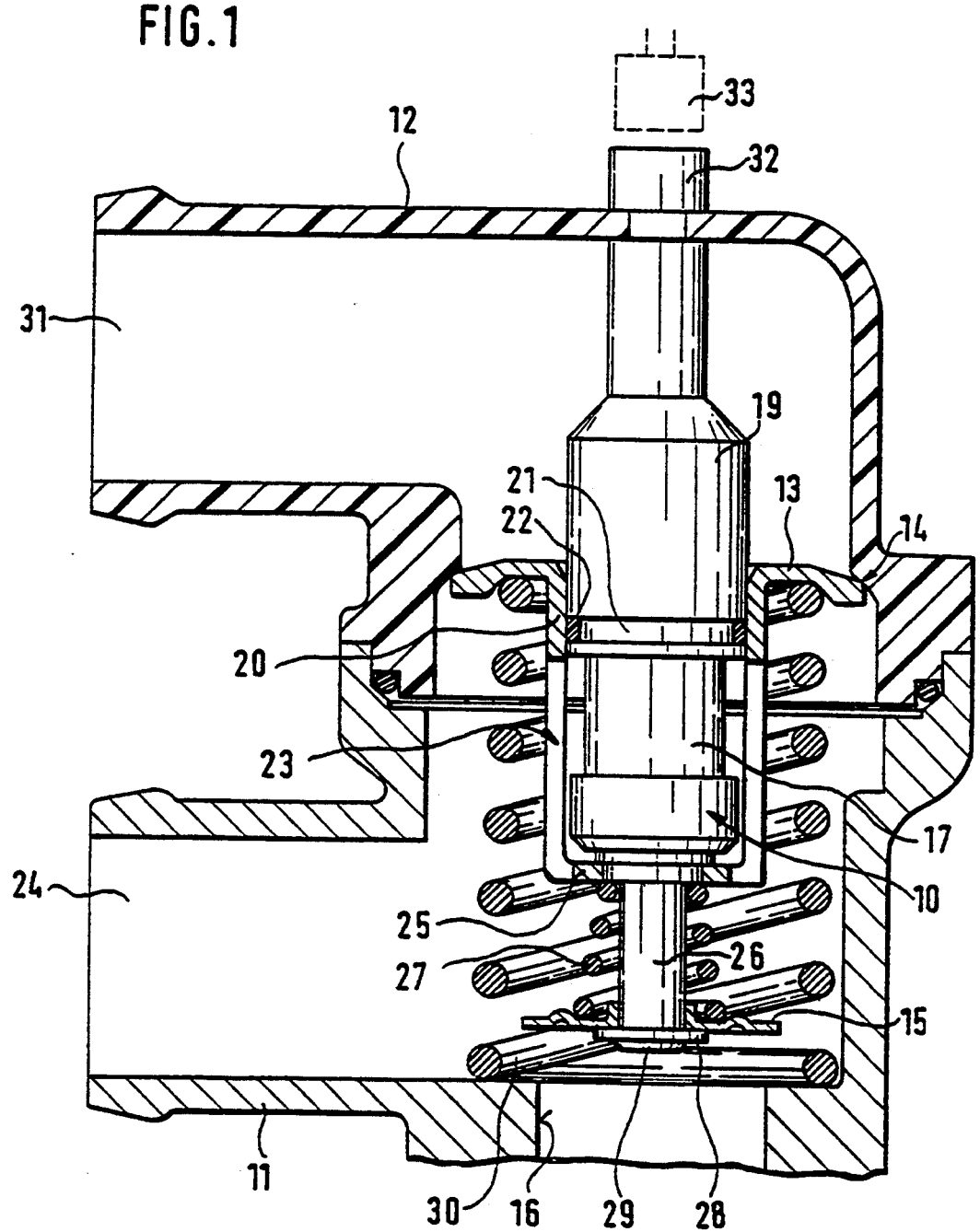
FIG. 1 is a sectional view of a thermostatic valve according to the invention in which the thermostatic working element and its holding device are not cut.

The thermostatic valve illustrated in FIG. 1 contains a thermostatic working element 10 which is arranged in a two-part valve gear housing 11, 12. The thermostatic working element 10 controls a main valve, which is formed by a valve disk 13 and a valve seat 14, as well as a bypass valve, which is formed by a valve disk 15 and a bypass opening 16.

A principal difference between the thermostatic valve according to the invention and a conventional thermostatic valve is the fact that the housing 17 of the thermostatic working element 10 is held in a stationary manner on part 12 of the valve gear housing, while its working piston (not visible in FIG. 1) is movable and is connected with the valve disks 13, 15. The housing 17 of the thermostatic working element 10 is held by a holding device 19 which reaches in the manner of a cap around the end of the housing 17 which is opposite the side from which the working piston moves out. The cap-type holding device 19 is supported on part 12 of the valve gear housing. In certain preferred embodiments, it is made of plastic. The cap-shaped holding device 19 is injection-molded to part 12 of the valve gear housing which in certain preferred embodiments is also made of plastic so that a tight connection is ensured.

The valve disk 13 of the main valve has a center area that is cup-shaped in its cross-section in which the thermostatic working element 10 is arranged. The cup-shaped area has a closed cylindrical section 20 which connects to the valve disk 13 and which, in the closed position of the main valve, forms a sealing point together with the holding device 19. For this purpose, the holding device 19 is provided with a ring groove 21 into which a sealing ring 22 is inserted. The area which connects to the ring 22 essentially comprises axial webs 23 so that the housing 17 of the thermostatic working element 10 is exposed in this area and, when the main valve is closed, is situated in the coolant flow which flows between a connection 24 and the bypass opening 16. The webs 23 hold a plate-shaped bottom 25 which is affected by the working piston moving out of the housing 17 of the working element 10. In the axial extension of the non-visible working piston of the working element 10, the bottom 25 is provided with a pin 26 on which the valve disk 15 of the bypass valve is arranged by means of a slideway. The valve disk 15 is loaded by a spring 27. This spring 27 presses the valve disk 15 against a lock washer 28 which is held on the pin 26 by means of a flanging 29.

The valve disk 13 of the main valve is loaded by a closing spring 30 which, in the case of the illustrated embodiment, is supported on part 11 of the valve gear housing. However, in the case of a modified embodiment, it is provided that arms which project downward in the drawing and which receive a spring disk for the closing spring 30 are mounted on part 12 of the valve gear housing on which the thermostatic working element 10 is held by means of a holding device. In this case, part 12, together with the whole thermostatic valve, is constructed as a preassembled structural unit which can be tested in this form with respect to its functioning.

The thermostatic valve illustrated in FIG. 1 is, for example, arranged in such a manner that via connection 24 the coolant which comes from the engine flows in. The coolant then flows either by way of the bypass opening 16 directly back to the engine or flows by way of connection 31 of part 12 of the valve first to a radiator and will then from there be fed to the engine again. When the engine is started, the coolant is at first still cold so that the coolant fed by way of connection 24 is guided directly back to the engine via the bypass connection 16. The housing 17 of the thermostatic working element is situated in this coolant flow. At a given temperature to which the expansion material, particularly wax, is adjusted, the working piston of the thermostatic working element 10 is moved out, whereby the main valve is opened up gradually and at the same time the bypass valve is closed gradually. At the operating temperature, the coolant will then flow completely from connection 24 to connection 31; that is, the coolant coming from the engine is guided completely through the radiator and is then guided back to the engine. Naturally, it is also possible to arrange the thermostatic valve according to FIG. 1 in the radiator runback which will then result in a somewhat different coolant guiding. However, it is ensured in both cases that the housing 17 of the thermostatic working element is situated in the coolant flow in which the initially cold coolant is circulating.

As will be explained in greater detail by means of FIG. 2, an electrical heating device is assigned to the housing 17 of the thermostatic working element so that, independently of the temperature of the coolant, the expansion material can be heated in such a manner that the working piston moves out and in the process actuates the main valve and the bypass valve and brings these valves into a position which is actually not assigned to the momentary temperature of the coolant. The heating element provided to the housing 17 and which may be mounted in or on the outside of the housing 17 is supplied by electric feed lines which extend through the holding device 19. As illustrated in FIG. 1, the holding device 19 is designed on the outside as a receiving device for a plug 33. The electric feed lines end in this receiving device 32 in the form of contacts.

Figure 2:
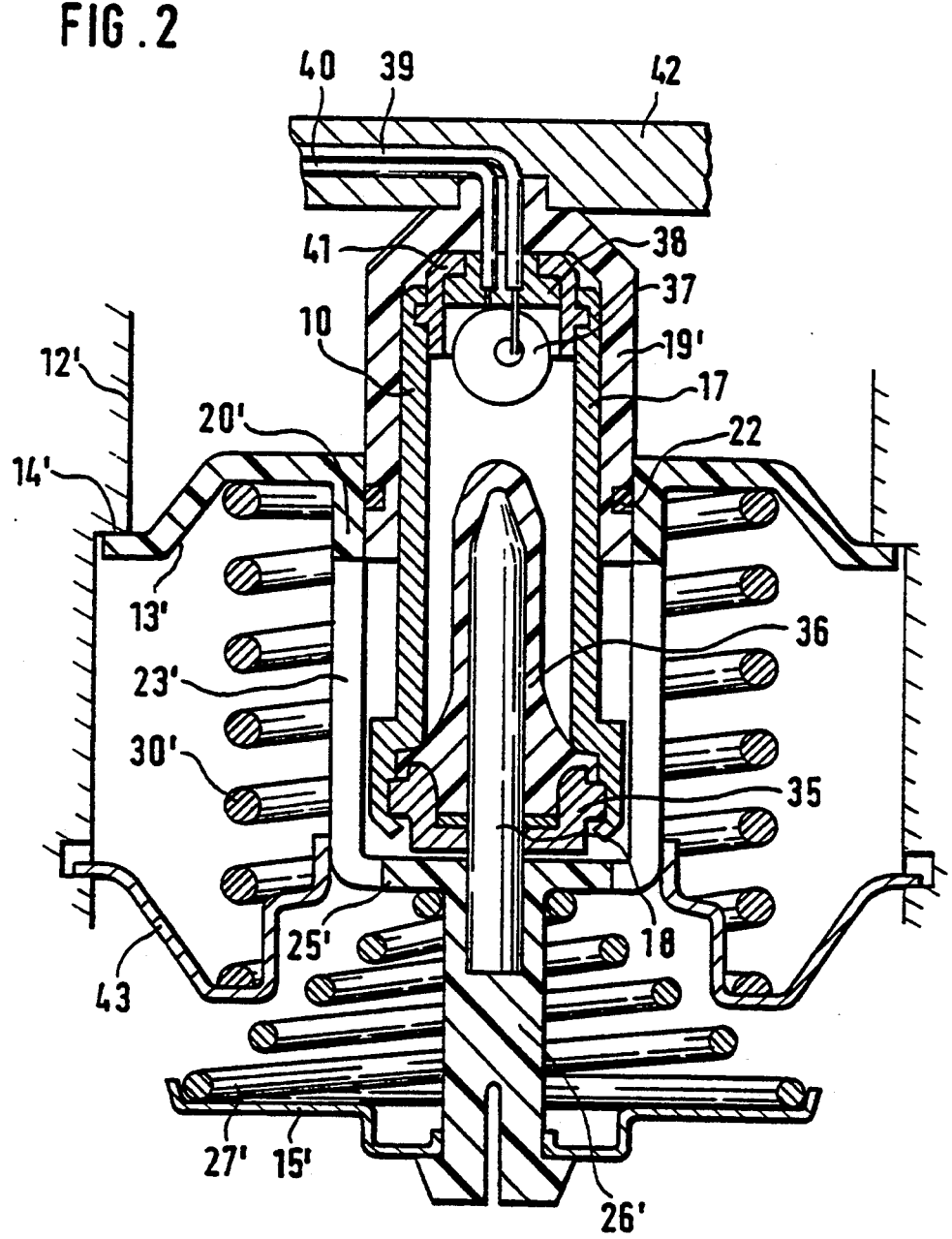
FIG. 2 is a slightly enlarged sectional view of the thermostatic working element in another embodiment according to the present invention.

FIG. 2 is a sectional view of the thermostatic working element and the valve elements which are identical to those shown in FIG. 1 with respect to their function but are slightly modified constructively. The housing 17 of the thermostatic working element is made of metal, particularly of brass. In its interior, it houses an expansion material, particularly a wax mixture. A working piston 18, which is guided in a guiding insert 35 closing off the housing 17, also projects into its interior. The guiding insert 35 is held by a flanged connection. The working piston 18 is surrounded by a pocket-type membrane 36 which is held by the guiding insert 35 against a seat of the housing 17. This pocket-type membrane 36 provides a secure sealing-off of the interior of the housing 17 while, at the same time, permits the movements of the working piston 18.

In the interior of the housing 17, that is, in the expansion material, a PTC-resistance is arranged as the electrical heating element 37 which heats up until it reaches a predetermined temperature and then increases its resistance in such a manner that it virtually blocks any further current conduction. The heating element 37 is held by an insert 38 in which the feed lines 39, 40 are arranged in a sealed-off manner. The insert 38 is held by a holding ring 41 which is fastened to the housing 17 by a flanged edge.

As indicated in FIG. 2, the cap-type holding device 19' envelopes the housing 17 in the area in which the heating element 37 is arranged. Between the holding device 19' and the housing 17, a sealing device, such as an adhesive, is provided. The holding device 19' is supported on a transverse web 42 through which the electrical supply lines 39, 40 are guided to the outside.

In the embodiment according to FIG. 2, the valve disk 13' of the main valve is constructed as a molded plastic part which is manufactured in one piece with the pin 26'. This pin 26' holds the valve disk 15' of the bypass valve by a clip connection.

In a modified embodiment, it is provided that, although the electric heating element 37 is arranged inside the cap-type holding device 19', it is arranged outside the housing 17 of the thermostatic working element, the working element being supported on the holding device 19' in the axial direction independently of the heating element.

In the embodiment according to FIG. 2, it is also provided that the closing spring 30' of the main valve is held by a spring plate 43 which is held by part 12' of the valve gear housing. As a result, it is possible to manufacture this part 12' of the valve gear housing together with the thermostatic working element as well as the main valve and the valve disk 15' of the bypass valve as a preassembled structural unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electrically heatable thermostatic valve for a coolant circulating system of an internal-combustion engine, comprising:
   a valve gear housing with stationary valve counterparts;
   a main valve which is closed when coolant in the system is cold, and has a movable valve element cooperating with one of the stationary valve counterparts;
   a bypass valve which is open when coolant in the system is cold, and has a valve element cooperating with another of the stationary counterparts;
   a thermostatic working element which has a housing which is provided with an electric heating element and which contains an expansion material having a volume that is a function of the temperature of the expansion material and a working piston whose position corresponds to the volume of the expansion material;
   wherein the housing of said working element is stationarily arranged in the valve gear housing and the working piston of said working element is connected with the valve element of the bypass valve and the valve element of the main valve;
   wherein the valve element of the main valve surrounds the housing of the working element to thereby form a sealing point with said housing;
   further comprising an open cage connecting the valve element of the main valve to the working piston of the thermostatic working element, said open cage exposing the housing of the working element to a stream of coolant passing through the bypass valve when coolant in the system is cold.

2. A thermostatic valve according to claim 1, Wherein the housing of the working element has a cap made of plastic in an area in which the heating element is located.

3. A thermostatic valve according to claim 2, wherein the cap is a holding device for the housing of the working element.

4. A thermostatic valve according to claim 3, further comprising a sealing device between an outer wall of the housing and the holding device.

5. A thermostatic valve according to one of claim 3, wherein the holding device of the housing of the working element is a plastic component injection-molded to a part of the valve gear housing.

6. A thermostatic valve according to claim 3, wherein the holding device for the housing protrudes out of the valve gear housing and includes a cable plug.

7. A thermostatic valve according to claim 1, wherein the valve element of the main valve is a valve disk that has an approximately cup-shaped center area with a closed edge section connecting to the valve disk, a bottom assigned to the working piston, and webs that connect the bottom and the edge section.

8. A thermostatic valve according to claim 7, wherein the bottom of the valve disk has a pin which is coaxial with respect to the working piston of the working element, the pin carrying the valve element of the bypass valve.

9. A thermostatic valve according to claim 8, wherein the valve element of the main valve is a one-piece molded plastic part.

10. A thermostatic valve according to claim 7, wherein the valve element of the main valve is a one-piece molded plastic part.

11. A thermostatic valve according to claim 1, further comprising a holding device that holds the housing of the working element, the holding device forming with the valve element of the main valve in the closed position, the sealing point blocking the flow.

* * * * *

UNITED STATES PATENT AND TRADEMARK OFFICE
CERTIFICATE OF CORRECTION

PATENT NO. : 5,385,296
DATED : January 31, 1995
INVENTOR(S) : Manfred Kurz and Roland Saur It is certified that error appears in the above-indentified patent and that said Letters Patent is hereby corrected as shown below:

Title page, item [73], Please designate the Assignee to be:

Behr-Thomson-Dehnstoffregler GmbH & Co.
Enzstrasse 25
70806 Kornwestheim
Germany Signed and Sealed this Twentieth Day of June, 1995

Attest:

BRUCE LEHMAN

*Attesting Officer*      *Commissioner of Patents and Trademarks*